May 20, 1969   R. J. JORDAN ET AL   3,445,669
RADIATION SENSITIVE CARBON MONOXIDE DETECTOR
Filed July 14, 1966
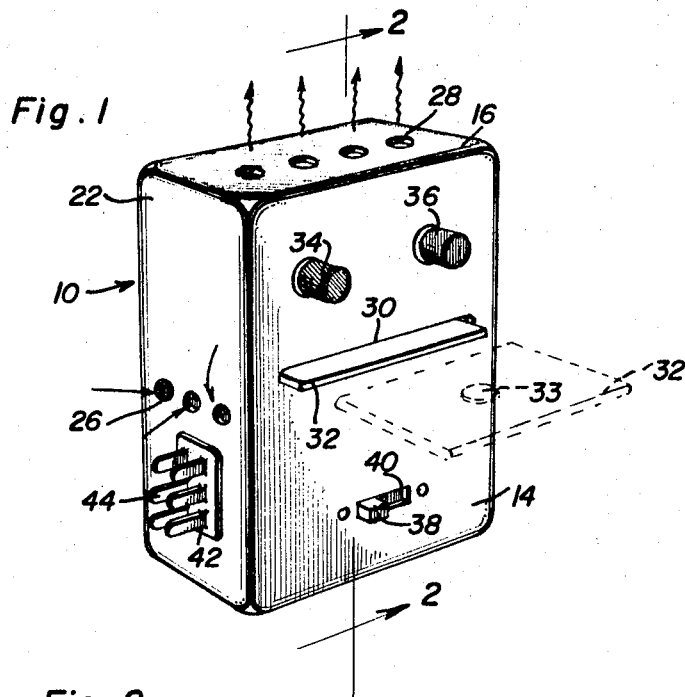
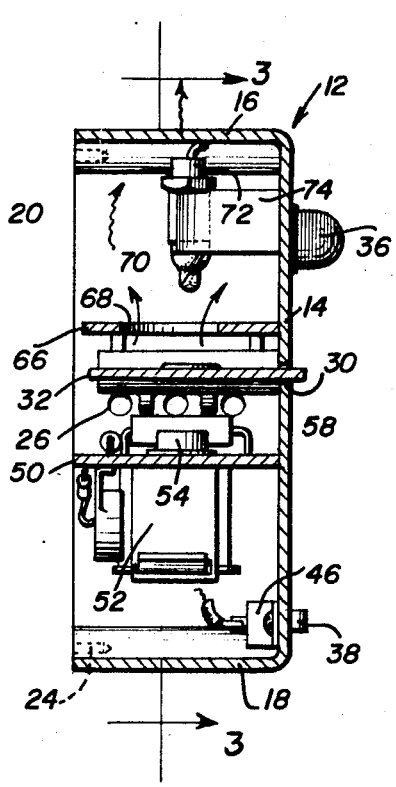
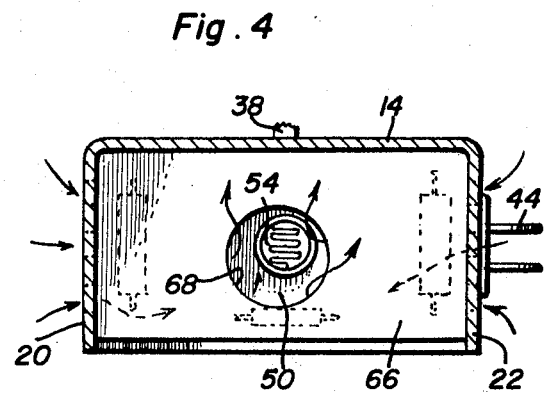
Richard J. Jordan
Paul N. Erickson
INVENTORS Richard J. Jordan
Paul N. Erickson
INVENTORS

United States Patent Office 3,445,669
Patented May 20, 1969

3,445,669
RADIATION SENSITIVE CARBON MONOXIDE DETECTOR
Richard J. Jordan, Roseville, and Paul N. Erickson, Detroit, Mich., assignors to General Marine, Inc., a corporation of Michigan
Filed July 14, 1966, Ser. No. 565,209
Int. Cl. G01n 21/26
U.S. Cl. 250—218                                     7 Claims

ABSTRACT OF THE DISCLOSURE

A detector for carbon monoxide including a casing having means provided for passage of air therethrough and a photoelectric detector incorporated therein including an insertable plate having a sensitive area thereon which will occlude the light transmitted therethrough when exposed to carbon monoxide. Heating elements are provided for inducing convection flow and heating the sensitive area to raise the temperature thereof.

---

The present invention generally relates to detecting apparatus for signalling the presence of a gaseous material, such as carbon monoxide in the atmosphere or ambient air in which the detecting apparatus is oriented.

The harmful effects of carbon monoxide is well documented and the incidence of injury and death due to carbon monoxide poisoning has been steadily increasing in recent years especially in areas where carbon monoxide is produced as a waste product or by-product and is normally discharged to the atmosphere or ambient air. For example, in areas having heavy vehicular travel, the carbon monoxide content of the ambient air or atmosphere sometimes is elevated above a level which can be safely tolerated by human beings. Many accidents, especially vehicular accidents are believed to be caused by an increased percentage of carbon monoxide in the air being breathed which causes drowsiness and increased reaction time which can be extremely hazardous when operating an automobile or vehicle.

While some efforts have been made to provide devices for detecting the presence of carbon monoxide, they generally have been unsuccessful insofar as cost and practical commercial arrangements are concerned. Accordingly, it is an object of the present invention to provide a carbon monoxide detector employing a photoelectric cell arrangement combined with replaceable disk or plate having a sensitive area that will occlude the photoelectric cell arrangement in response to exposure of the sensitive area of the disk or plate to carbon monoxide with such occulsion serving to actuate a signal which may be audible, visual or corrective or any other desired signal or combination of signals depending upon the installation.

Another object of the present invention is to provide a carbon monoxide detector including a structural arrangement which orientates the light component of the photoelectric cell arrangement adjacent the sensitive area so that the heat of the light, acting as a catalyst, will increase the reaction of the sensitive area to the presence of carbon monoxide.

Yet another important object of the present invention is to provide a carbon monoxide detector in accordance with the preceding objects including a housing structurally arranged to provide lower inlets and upper outlets for the ambient air or atmosphere to enable the structure to derive benefit from a thermo-siphon or chimney effect for forced flow of ambient air through the detector with the sensitive area of the disk or plate being orientated to the flow path of the ambient air to provide positive impingement of the ambient air onto the sensitive area and with the light source of the photoelectric cell arrangement being orientated in the flow path to force the flow of ambient air suspected of being contaminated by heating such air and causing it to flow upwardly through the upper outlets provided therefor.

Still another significant feature of the present invention is to provide a carbon monoxide detector having resistor elements orientated in an electrical circuit for energizing the photoelectric cell arrangement which also produced heat and are orientated in the path of flow of the ambient air to further induce flow over the sensitive area of the disk or plate due to raising the temperature of such air thus enhancing the chimney effect. Also, the resistor elements are orientated downstream in the flow path of the ambient air to raise the temperature thereof with the elevated temperature of the ambient air impinging upon the sensitive area serving to heat the sensitive area in addition to the light source of the photoelectric cell thus further serving to a catalytic effect to render the sensitive area highly sensitive to the presence of carbon monoxide in the ambient air.

Still another important object of the present invention is to provide a carbon monoxide detector which may be constructed as a self-contained unit with both the detecting apparatus and signalling apparatus orientated in a single housing or constructed in such a manner that the signalling device may be orientated in a remote location to the detecting apparatus thus enabling a plurality of detecting apparatuses to be orientated at a plurality of locations with the signalling apparatus being orientated in a central location to enable the carbon monoxide content of various remote areas to be measured thus enabling a person to determine whether it is safe to enter a particular area without actually entering the area.

In addition to the previously set forth objects, the present invention is constructed and arranged in such a manner that not only is carbon monoxide efficiently detected but the initial cost and cost of maintenance and operation is retained at a reasonably low level.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

FIGURE 1 is a perspective view of the carbon monoxide detector of the present invention;

FIGURE 2 is a vertical sectional view taken substantially upon a plane passing along section line 2—2 of FIGURE 1 illustrating the structural details of the invention with the rear cover plate removed;

FIGURE 4 is a transverse, plan sectional view taken substantially upon a plane passing along section line 4—4 of FIGURE 3 illustrating the orientation of certain of the components of the detector.

Figure 3:
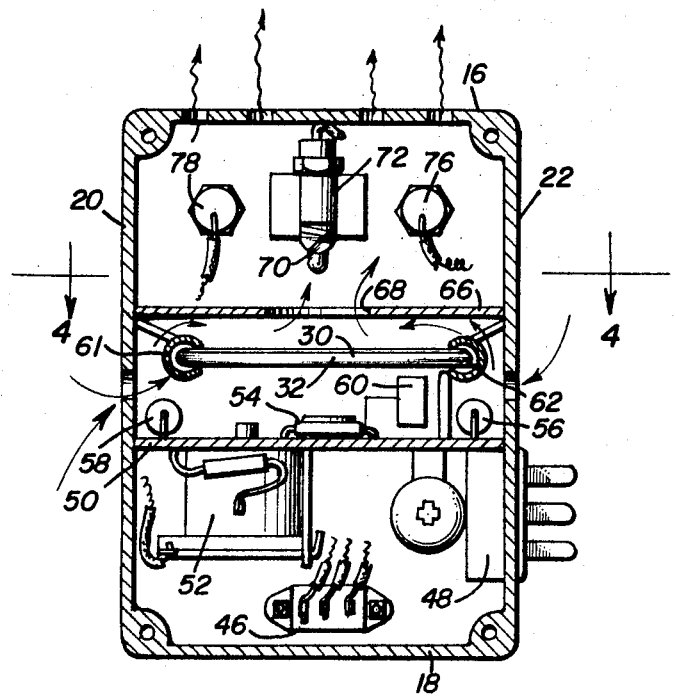
FIGURE 3 is a vertical sectional view taken substantially upon a plane passing along section line 3—3 of FIGURE 2 illustrating further structural details of the carbon monoxide detector illustrating the structural arrangement of the components of the detector.

Referring now specifically to the drawings, the numeral 10 generally designates the carbon monoxide detector of the present invention which is provided with a housing or casing 12 of any suitable material such as high impact plastic material or the like. The casing 12 includes a generally flat front wall 14, a top wall 16, a bottom wall 18 and side walls 20 and 22 all of which are interconnected and of interval one-piece construction. A rear wall or cover plate is provided for the open back of the casing 12 with the cover or back plate being removed for illustrative purposes with the sockets 24 being illustrated for receiving the fasteners such as screws for the rear wall or cover plate.

Each of the side walls 20 and 22 of the casing 12 is provided with a plurality of apertures 26 forming an inlet for the ambient air as illustrated by the arrows in the various figures. The top wall 16 is also provided with a plurality of apertures 28 which form outlets in the upper end of the casing 12 for upward discharge of ambient air as indicated by the arrows in FIGURES 1-3 extending upwardly through and above the apertures 28. The flow of the ambient air is induced by a natural draft or chimney effect caused by the heating of the air within the casing 12 so that the lighter air will normally discharge upwardly on through the apertures 28 in a known manner.

The front wall 14 is provided with a horizontally disposed elongated relatively narrow slot 30 therein which extends substantially completely across the width of the front wall for receiving a detector plate or disk 32 which has a sensitive area orientated centrally thereof. When the detecting disk or plate 32 is inserted into the slot 30, the edge of the disk projects from the slot to enable easy grasping thereof and the sensitive area or spot on the detector disk will be placed upwardly or toward the top of the casing 12 and suitable indicia may be printed adjacent the slot 30 for indicating that the detector disk or plate is to be inserted with the slot facing upwardly. Orientated in the front wall 14 above the slot 30 is an indicator light assembly 34 adjacent the upper left corner thereof and a danger light assembly 36 adjacent the upper right corner. The lens portion of the safe light assembly 34 may be green to indicate that the ambient air can be safely breathed without danger whereas the lens in the danger light assembly 36 may be amber or red to indicate that the ambient air contains a dangerous percentage of carbon monoxide.

Also, adjacent the bottom of the front wall 14, a switch actuator 38 extends outwardly through a slot 40 therein for connecting the detector 10 to a source of electrical energy such as a battery or the like and also providing a connection of the detector 10 to a remote indicator panel. For connecting the detector 10 to a remote indicator panel, a connector plug 42 is provided on the side wall 22 with the connector plug assembly including a plurality of projecting prongs or pins 44 for association with a suitable female socket for connection to an indicator panel at a remote location which will have a central source of power or for connection to an independent source of power such as a battery or the like and the switch actuator 38 may be positioned in either a "manual" position or "remote" position.

As illustrated in FIGURES 2 and 3, the switch structure 46 is mounted interiorly on the front wall 14 and the plug body or housing 48 is also mounted interiorly on the wall 22. The specific structural details of the switch 46 and the plug assembly 42 do not form any particular component of the present invention and any well-known commercially available item may be employed.

Extending transversely of the casing 12 parallel to the bottom wall 18 and spaced below the slot 30 is a partition wall or mounting board 50 having various of the electrical components supported thereon in a conventional manner. For example, a relay assembly 52 is suspended below the mounting board 50 and mounted above the mounting board 50 is the sensing element 54 of a photoelectric cell arrangement together with resistance elements 56 and 58 and transistors 60. Extending upwardly from the mounting board 50 in parallel relation to the wall 22 but in spaced relation thereto is a baffle plate or wall 62 which deflects air coming in through the apertures 26 in the wall 22 upwardly and over the baffle plate 62 and upwardly around the edge of the detector disk 32 which is inserted through the slot 30 and retained in place by split cylindrical supporting sleeves 64 which slidingly receive the edges of the plate 32 and form baffles for movement of the air around the edges of the disk 32 so that such air will then impinge against the bottom surface of a partition wall 66 and be deflected downwardly against the sensitive area or spot in the detector disk 32. The mechanical associational relationship of the resistor elements 56 and 58, the baffle 62, the detector disk or plate 32, the supporting member 64 therefor and the partition 66 all are illustrated in FIGURE 3 and are oriented in such a manner to insure that air flowing into the apertures will be heated by the resistor elements 56 and 58 and then pass upwardly and over toward the center of the detector disk 32 for impingement against the sensitive area in the detector disk.

The partition 66 has a central opening 68 therein in alignment with the sensitive area of the detector disk 32 and this provides for passage of the heated ambient air and also provides passage of light from a light bulb 70 forming the light source of the photoelectric arrangement which is directed toward the sensing element 54 and the light source or bulb 70 is supported in a suitable socket 72 and is of a construction having a built-in reflector for directing a light beam toward the sensing component 54 of the photoelectric cell arrangement and as long as the sensitive area of the disk 32 remains white and transparent or translucent, the light passing through the sensitive area will be sensed by sensor 54 to retain the safe light 34 energized. However, when carbon monoxide impinges against or comes into contact wtih the sensitive area, the sensitive area will turn dark and opacity of the sensitive area will increase thus occluding the sensing cell 54 so that the sensing cell will then energize the danger light assembly 36 and deenergize the safe light 34.

As illustrated, the light socket 72 is supported by a suitable bracket 74 and the light 34 is provided with a suitable socket 76 while the light 36 also includes a suitable socket assembly 78 all of which are conventional in construction. In fact, the electrical components are conventional and any suitable electrical arrangement may be provided including various solid state components, printed circuitry and the like.

Figure 5:
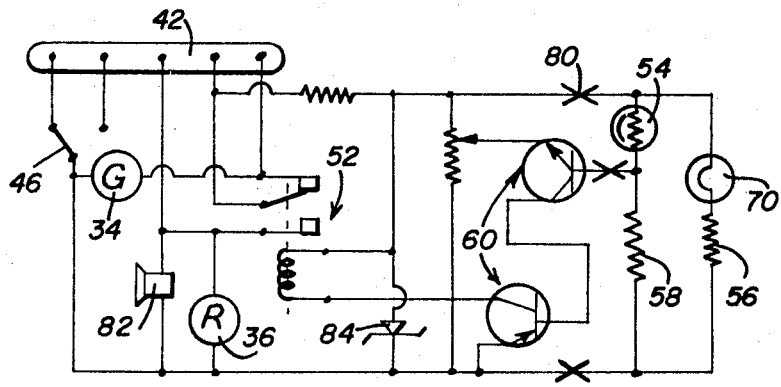
FIGURE 5 is a schematic view illustrating a typical electric circuit which may be employed in the present invention.

FIGURE 5 illustrates an electrical circuit which may be employed in conjunction with the present invention. Other types of circuits may be employed depending upon the installational problems. FIGURE 5 does illustrate at the facing arrows 80 that the sensing components of the detecting device including the light source 70, sensing element 74 and resistors 56 and 58 may be located remotely and the three wires having the double arrows 80 therein would be separated and provided with suitable connecting means for connecting to the electrical circuitry employed for energizing a signal device which may be in the form of an audible signal produced by a horn, buzzer or the like designated by numeral 82. Also, a voltage regulator 84 may be incorporated into the circuit if desired dependent upon the type of power available and the sensitivity required for the particular unit. Circuits without voltage regulators may be employed with series resistors interposed in the power supply which are self-regulating over a narrow range. As the supply voltage increases, the lamp in the circuit draws more current thereby causing a greater voltage drop across the series resistor. At the same time, the lamp becomes brighter reducing the output of the transistor circuit. In the event of a reduction in the supply voltage, the above actions are reversed.

By employing the present invention, an inexpensive warning device to indicate a dangerous condition of carbon monoxide in the air can be provided. Since a relatively low carbon monoxide content in the air can prove fatal and because carbon monoxide is both odorless and invisible, the present device makes use of established chemical reactions that react to turn a chemical compound from a light color to a dark or black color upon exposure to carbon monoxide. The light beam is projected through the unactivated chemical compound in the sensing area of the disk and the transmitted light strikes the face of a photo-conductive cell whose resistance is a function of the amount of light striking it. Impingement of carbon monoxide on the chemical compound reacts to cause the chemical compound to darken thus causing an increase in the photo-cell resistance. The electrical circuit is so constructed that an increase in resistance will increase the forward bias on the first transistor stage and this signal is amplified and directly coupled to the base of the second stage resistor where it receives additional amplification. The amplified signal may then be applied directly to a relay coil in a collector circuit of the output stage or it may be applied across a load resistor to be used for control of another circuit. In certain instances, the output signal may be used to control the gate of a silicon controlled rectifier or any other suitable circuit may be employed for utilizing the signal produced by the sensing or detecting apparatus. The components are orientated so that the heat of convection from the bulb will induce the chimney action with the warm air rising through the casing drawing outside air up through the instrument over the chemical sensitive compound and substantially a continuous draft. The heat from the bulb also acts as a catalyst on the chemical compound causing it to be more sensitive to carbon monoxide and to react quicker to its presence.

The plate 32 having the sensitive area 33 thereon may include any of several known materials such as a gel impregnated with palladus sulphate and ammonium molybdate; palladus chloride, phosphomolybdic acid, acetone or a commercially available sensing disk distributed in this country by Intra-Port Ltd., Box 68, Allenhurst, N.J., which become more sensitive to carbon monoxide when the temperature is maintained above a predetermined level. The temperature effect on such materials is well known as set forth in an article under the title "Rapid Determination of Small Amounts of Carbon Monoxide," by Martin Shepherd, appearing in "Industrial and Engineering Chemistry" (Analytical Chemistry), vol. 19, page 77, February 1947, as well as in a publication "Analytical Chemistry of Industrial Poison Hazards and Solvents," by M. B. Jacobs, pages 324–325, and an article appearing in the March 1938 publication by the chemical department of the South Metropolitan Gas Company entitled "The Determination of Low Concentrations of Carbon Monoxide." All of these literature publications disclose the temperature effect upon carbon monoxide detecting substances such as employed herein.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is as follows:

1. A carbon monoxide detector comprising a generally hollow casing having air inlet means in the lower portion thereof and air outlet means in the upper portion thereof for flow of ambient air therethrough, a photo-cell assembly disposed in said casing and including a lamp orientated in the flow path of air to heat the air to provide upward movement of the heated air through the outlet for inducing air flow through the casing, said photo-cell assembly including a sensing element spaced from the lamp, said casing including means receiving and positioning a sensing area between the light source and the sensing element of the photo-cell assembly for occluding the light transmitted to the sensing element when air containing carbon monoxide above a predetermined portion is engaged with the sensitive area, and an electrical circuit operatively associated with the sensing element for producing a signal in response to occlusion of the sensing element, said lamp of the photo-cell assembly being disposed adjacent the sensitive area for heating the sensitive area thereby increasing the sensitivity thereof to carbon monoxide, said electrical circuit including resistance elements disposed in the flow path of ambient air entering the casing on the downstream side from the sensitive area for preheating the air to further induce air flow through the casing and to heat the sensitive area by heating the air to be impinged thereon.

2. The structure as defined in claim 1 wherein said casing is provided with a partition wall between the lamp of the photo-cell assembly and the sensitive area, said partition having a central opening aligned with the sensitive area and the light to provide a limited area of flow for the air passing upwardly in the casing to assure impingement of said air against the sensitive area.

3. The structure as defined in claim 2 wherein said casing is provided with a slot in one wall thereof, and split tubular sleeve-like supports in alignment with the edges of the slot for supporting a rigid plate having the sensitive area thereon to enable replacement of the plate and replacement of the sensitive area.

4. In a gas detecting device having a hollow housing, said improvement comprising the provision of a multiplicity of inlet apertures in the bottom portion of the casing to provide inlet of ambient air from a plurality of positions, a plurality of openings in the top of the casing to provide outlet of ambient air, a photo-cell assembly disposed in the casing and including a lamp as a light source and a sensing element spaced therefrom, said lamp being orientated in the flow path of air through the casing to heat the air and induce thermal flow of air therethrough, means in the casing for supporting a carbon monoxide sensitive area between the light source and sensing element of the photo-cell assembly for occluding the sensitive element when the sensitive area is contacted by carbon monoxide for darkening the sensitive area, said means retaining the sensitive area adjacent to and in alignment with the lamp for heating the sensitive area for increasing the sensitivity thereof.

5. The structure as defined in claim 4 wherein said photo-cell assembly is connected in an electrical circuit having resistor elements associated therewith disposed adjacent the sensitive area and in the flow path of air entering the casing on the downstream side of the sensitive area for heating such air for increasing flow thereof and further increasing the temperature of the sensitive area to increase the sensitivity thereof.

6. The structure as defined in claim 5 together with baffle means disposed within said casing for defining a flow path of ambient air therethrough for directing such air into contact with the sensitive area.

7. A carbon monoxide detector comprising a generally hollow casing having air inlet means and air outlet means for flow of ambient air therethrough, a photo-cell assembly disposed in said casing and including a lamp orientated in the flow path of air to heat the air to provide upward convection movement of the heated air from the air inlet means through the air outlet means for inducing air flow through the casing, said photo-cell assembly including a sensing element spaced from the lamp, said casing including means receiving and positioning a sensing area between the light source and the sensing element of the photo-cell assembly for occluding the light transmitted to the sensing element when air containing carbon monoxide above a predetermined portion is engaged with the sensitive area, and an electrical circuit operatively associated with the sensing element for producing a signal in response to occlusion of the sensing element, said lamp of the photo-cell assembly being disposed adjacent the sensitive area for heating the sensitive area thereby increasing the sensitivity thereof to carbon monoxide, and heating means disposed in the flow path of air to heat the air prior to its impingement on the sensitive area.

References Cited

UNITED STATES PATENTS

| | | | |
|---|---|---|---|
| 2,024,720 | 12/1935 | Cornell et al. | 250—218 |
| 2,537,028 | 1/1951 | Cahusac et al. | 250—218 |
| 3,276,004 | 9/1966 | Mayo | 340—237 |
| 3,312,826 | 4/1967 | Finkle | 250—218 |

WALTER STOLWEIN, *Primary Examiner.*

U.S. Cl. X.R.

250—226; 340—237